(12) United States Patent
Chiang et al.

(10) Patent No.: US 12,047,596 B2
(45) Date of Patent: Jul. 23, 2024

(54) METHOD AND APPARATUS OF COMBINED INTER AND INTRA PREDICTION FOR VIDEO CODING (71) Applicant: MEDIATEK INC., Hsinchu (TW)

(72) Inventors: Man-Shu Chiang, Hsinchu (TW); Chih-Wei Hsu, Hsinchu (TW); Tzu-Der Chuang, Hsinchu (TW); Ching-Yeh Chen, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 321 days.

(21) Appl. No.: 17/426,077

(22) PCT Filed: Jan. 22, 2020

(86) PCT No.: PCT/CN2020/073876
§ 371 (c)(1),
(2) Date: Jul. 27, 2021

(87) PCT Pub. No.: WO2020/156464
PCT Pub. Date: Aug. 6, 2020

(65) Prior Publication Data
US 2022/0103854 A1  Mar. 31, 2022

Related U.S. Application Data (60) Provisional application No. 62/799,782, filed on Feb. 1, 2019, provisional application No. 62/799,127, filed on Jan. 31, 2019.

(51) Int. Cl.
*H04N 19/513* (2014.01)
*H04N 19/119* (2014.01)
(Continued)

(52) U.S. Cl.
CPC ......... *H04N 19/513* (2014.11); *H04N 19/119* (2014.11); *H04N 19/176* (2014.11); *H04N 19/593* (2014.11)

(58) Field of Classification Search
None
See application file for complete search history.

(56) References Cited

U.S. PATENT DOCUMENTS 9,532,058 B2    12/2016 Chien et al.
9,900,610 B2    2/2018  Song et al.
(Continued)

FOREIGN PATENT DOCUMENTS

CN    101888549 A    11/2010
CN    102740077 A    10/2012
(Continued)

OTHER PUBLICATIONS

Non-Final Office Action dated Dec. 30, 2021, issued in U.S. Appl. No. 17/426,081 (copy not provided).
(Continued)

*Primary Examiner* — Reza Aghevli
(74) *Attorney, Agent, or Firm* — McClure, Qualey & Rodack, LLP (57) ABSTRACT A method and apparatus of prediction for video coding are disclosed. According to one method, a block is partitioned into a first and second regions using a target partition selected from a partition set comprising triangle partition. A Merge candidate list is determined for a partitioned current block by including at least one HMVP (history-based motion vector prediction) candidate from an HMVP buffer, where the HMVP buffer stores motion information of previously coded blocks. The partitioned current block or current motion information associated with the partitioned current block are encoded or decoded using the Merge candidate
(Continued)

list, where the Merge candidate list is used to derive a first candidate for the first region and a second candidate for the second region. In another method, whether to apply triangular CIIP (combined Inter/Intra prediction) to the current block is signaled at an encoder side or parsed at a decoder side.

16 Claims, 8 Drawing Sheets

(51) Int. Cl.
  *H04N 19/176* (2014.01)
  *H04N 19/593* (2014.01)

(56) References Cited

U.S. PATENT DOCUMENTS

| | | | |
|---|---|---|---|
| 10,554,970 | B2 | 2/2020 | Moriya et al. |
| 10,587,897 | B2 | 3/2020 | Qu et al. |
| 10,958,932 | B2* | 3/2021 | Chien .................. H04N 19/176 |
| 11,012,697 | B2* | 5/2021 | Seregin ............... H04N 19/176 |
| 11,019,357 | B2* | 5/2021 | Han ....................... H04N 19/61 |
| 2013/0266070 | A1 | 10/2013 | Sato |
| 2013/0272413 | A1 | 10/2013 | Seregin et al. |
| 2015/0117535 | A1 | 4/2015 | Li et al. |
| 2015/0208090 | A1 | 7/2015 | Sakakibara et al. |
| 2016/0381359 | A1 | 12/2016 | Kim et al. |
| 2018/0376137 | A1 | 12/2018 | Jun et al. |
| 2020/0077113 | A1* | 3/2020 | Huang ................. H04N 19/167 |
| 2020/0099951 | A1* | 3/2020 | Hung .................... H04N 19/61 |
| 2020/0112715 | A1* | 4/2020 | Hung .................. H04N 19/433 |
| 2020/0112741 | A1* | 4/2020 | Han ..................... H04N 19/172 |
| 2020/0169745 | A1* | 5/2020 | Han ..................... H04N 19/513 |
| 2020/0260072 | A1* | 8/2020 | Park .................... H04N 19/132 |
| 2020/0351511 | A1 | 11/2020 | Ahn et al. |
| 2020/0366895 | A1 | 11/2020 | De Luxan et al. |
| 2020/0389661 | A1* | 12/2020 | Zhao ................... H04N 19/625 |
| 2020/0389671 | A1* | 12/2020 | Zhao ..................... H04N 19/80 |
| 2021/0006787 | A1* | 1/2021 | Zhang .................. H04N 19/593 |
| 2021/0136373 | A1 | 5/2021 | De Luxan et al. |
| 2021/0144374 | A1* | 5/2021 | Esenlik ................. H04N 19/70 |
| 2021/0195229 | A1* | 6/2021 | Esenlik ............... H04N 19/513 |
| 2021/0203922 | A1* | 7/2021 | Zhang .................. H04N 19/105 |
| 2021/0203933 | A1 | 7/2021 | Rosewarne |
| 2021/0203980 | A1* | 7/2021 | Esenlik ................. H04N 19/52 |
| 2021/0227260 | A1 | 7/2021 | Lee |
| 2021/0243470 | A1* | 8/2021 | Solovyev ............. H04N 19/176 |
| 2021/0258574 | A1* | 8/2021 | Gao ....................... H04N 19/46 |
| 2021/0266581 | A1 | 8/2021 | Jung et al. |
| 2021/0266586 | A1* | 8/2021 | Leleannec ............. H04N 19/52 |
| 2021/0274208 | A1* | 9/2021 | Zhang ................. H04N 19/139 |
| 2021/0352287 | A1* | 11/2021 | Esenlik ............... H04N 19/176 |
| 2021/0360240 | A1 | 11/2021 | Lee |
| 2021/0360245 | A1* | 11/2021 | Xu ......................... H04N 19/52 |
| 2022/0070448 | A1* | 3/2022 | Kim .................... H04N 19/109 |
| 2022/0086433 | A1* | 3/2022 | Zhang ................. H04N 19/137 |
| 2022/0103854 | A1* | 3/2022 | Chiang ............... H04N 19/119 |
| 2022/0109830 | A1* | 4/2022 | Chen .................... H04N 19/176 |

FOREIGN PATENT DOCUMENTS

| | | | |
|---|---|---|---|
| CN | 103004198 A | 3/2013 | |
| CN | 103250416 A | 8/2013 | |
| CN | 106375765 A | 2/2017 | |
| CN | 106998473 A | 8/2017 | |
| TW | 201642656 A | 12/2016 | |
| WO | 2015/006884 A1 | 1/2015 | |
| WO | WO-2015006884 A1 * | 1/2015 | ........... H04N 19/103 |
| WO | 2017/086738 A1 | 5/2017 | |
| WO | 2020/088690 A1 | 5/2020 | |

OTHER PUBLICATIONS

Chinese language office action dated May 4, 2023, issued in application No. CN 202080011842.0.
International Search Report and Written Opinion dated Apr. 21, 2020, issued in application No. PCT/CN2020/073876.
Zhang, L., et al.; "CE4: History-based Motion Vector Prediction (Test 4.4.7);" Joint Video Experts Team (JVET) of ITU-T SG 16 WP 3 and ISO/IEC JTC 1/SC 29/WG 11; Oct. 2018; pp. 1-158.
Chinese language office action dated Mar. 30, 2021, issued in application No. TW 109102601.
Toma, T., et al.; "Description of SDR video coding technology proposal by Panasonic;" Joint Video Experts Team (JVET) of ITU-T SG 16 WP 3 and ISO/IEC JTC 1/SC 29/WG 11; Apr. 2018; pp. 1-169.
International Search Report and Written Opinion dated Apr. 26, 2020, issued in application No. PCT/CN2020/073845.
Chinese language Notice of Allowance dated Jun. 21, 2021, issued in application No. TW 109102600.
Partial Supplementary European Search Report dated Oct. 28, 2022, issued in application No. EP 20748555.8.
Tamse, A., et al.; "CE10-related: Triangular Prediction Mode Harmonization;" Joint Video Experts Team (JVET) of ITU-T SG 16 WP 3 and ISO/IEC JTC 1/SC 29/WG 11; Jan. 2019; pp. 1-5.
Bross, B., et al.; "Versatile Video Coding (Draft 3);" Joint Video Experts Team (JVET) of ITU-T SG 16 WP 3 and ISO/IEC JTC 1/SC 29/WG 11; Oct. 2018; pp. 1-236.
Liao ,et al.; "CE10.3.1.b: Triangular prediction unit mode;" Joint Video Experts Team (JVET) of ITU-T SG 16 WP 3 and ISO/IEC JTC 1/SC 29/WG 11; Oct. 2018; pp. 1-6.
Zhang, L., et al.; "CE4-related: History-based Motion Vector Prediction;" Joint Video Experts Team (JVET) of ITU-T SG 16 WP 3 and ISO/IEC JTC 1/SC 29/WG 11; Jul. 2018; pp. 1-6.
Zhao, J., et al.; "CE4: Methods of Reducing Number of Pruning Checks of History Based Motion Vector Prediction (Test 4.1.1);" Jan. 2019; pp. 1-6.

* cited by examiner

METHOD AND APPARATUS OF COMBINED INTER AND INTRA PREDICTION FOR VIDEO CODING

CROSS REFERENCE TO RELATED PATENT APPLICATION(S)

The present invention claims priority to U.S. Provisional Patent Application, Ser. No. 62/799,127, filed on Jan. 31, 2019 and U.S. Provisional Patent Application, Ser. No. 62/799,782, filed on Feb. 1, 2019. The U.S. Provisional Patent Applications are hereby incorporated by reference in their entireties.

TECHNICAL FIELD

The present invention relates to prediction for video coding using TPM (Triangle Prediction Mode) and CIIP (Combined Inter/Intra Prediction). In particular, the present invention discloses candidate list derivation for the TPM using HMVP (History-based Motion Vector Prediction). Also, a method of signaling for triangle CIIP is disclosed.

BACKGROUND

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes (i.e., Intra prediction and Inter prediction) for each PU. For Intra prediction modes, the spatial neighbouring reconstructed pixels can be used to generate the directional predictions. There are up to 35 directions in HEVC. For Inter prediction modes, the temporal reconstructed reference frames can be used to generate motion compensated predictions. There are three different modes, including Skip, Merge and Inter Advanced Motion Vector Prediction (AMVP) modes.

When a PU is coded in Inter AMVP mode, motion-compensated prediction is performed with transmitted motion vector differences (MVDs) that can be used together with Motion Vector Predictors (MVPs) for deriving motion vectors (MVs). To decide MVP in Inter AMVP mode, the advanced motion vector prediction (AMVP) scheme is used to select a motion vector predictor among an AMVP candidate set including two spatial MVPs and one temporal MVP. So, in AMVP mode, MVP index for MVP and the corresponding MVDs are required to be encoded and transmitted. In addition, the Inter prediction direction to specify the prediction directions among bi-prediction, and uni-prediction which are list 0 (i.e., L0) and list 1 (i.e., L1), accompanied with the reference frame index for each list should also be encoded and transmitted.

When a PU is coded in either Skip or Merge mode, no motion information is transmitted except for the Merge index of the selected candidate since the Skip and Merge modes utilize motion inference methods. Since the motion vector difference (MVD) is zero for the Skip and Merge modes, the MV for the Skip or Merge coded block is the same as the motion vector predictor (MVP) (i.e., MV=MVP+MVD=MVP). Accordingly, the Skip or Merge coded block obtains the motion information from spatially neighboring blocks (spatial candidates) or a temporal block (temporal candidate) located in a co-located picture. The co-located picture is the first reference picture in list 0 or list 1, which is signaled in the slice header. In the case of a Skip PU, the residual signal is also omitted. To decide the Merge index for the Skip and Merge modes, the Merge scheme is used to select a motion vector predictor among a Merge candidate set containing four spatial MVPs and one temporal MVP.

Figure 1:
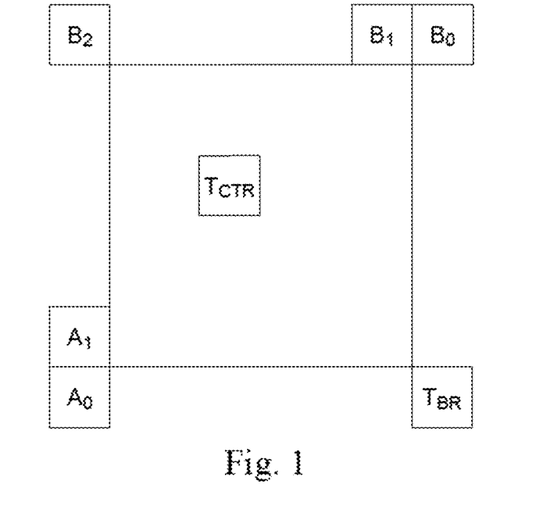
FIG. 1 shows the neighboring PUs used to derive the spatial and temporal MVPs for both AMVP and Merge scheme.

FIG. 1 shows the neighboring PUs used to derive the spatial and temporal MVPs for both AMVP and Merge scheme. In AMVP, the left MVP is the first available one from $A_0$, $A_1$, the top MVP is the first available one from $B_0$, $B_1$, $B_2$, and the temporal MVP is the first available one from $T_{BR}$ or $T_{CTR}$ ($T_{BR}$ is used first, if $T_{BR}$ is not available, $T_{CTR}$ is used instead). If the left MVP is not available and the top MVP is not scaled MVP, the second top MVP can be derived if there is a scaled MVP among $B_0$, $B_1$, and $B_2$. The list size of MVPs of AMVP is 2 in HEVC. Therefore, after the derivation process of the two spatial MVPs and one temporal MVP, only the first two MVPs can be included in the MVP list. If after removing redundancy, the number of available MVPs is less than two, zero vector candidates are added to the candidates list.

For Skip and Merge mode, as shown in FIG. 1, up to four spatial Merge index are derived from $A_0$, $A_1$, $B_0$ and $B_1$, and one temporal Merge index is derived from $T_{BR}$ or $T_{CTR}$ ($T_{BR}$ is used first, if $T_{BR}$ is not available, $T_{CTR}$ is used instead). Note that if any of the four spatial Merge index is not available, the position $B_2$ is then used to derive Merge index as a replacement. After the derivation process of the four spatial Merge index and one temporal Merge index, removing redundancy is applied to remove redundant Merge index. If after removing redundancy, the number of available Merge index is smaller than five, three types of additional candidates are derived and are added to the candidates list.

Additional bi-predictive Merge candidates are created by using original Merge candidates. The additional candidates are divided into three candidate types:
1. Combined bi-predictive Merge candidate (candidate type 1)
2. Scaled bi-predictive Merge candidate (candidate type 2)
3. Zero vector Merge/AMVP candidate (candidate type 3)

Figure 2:
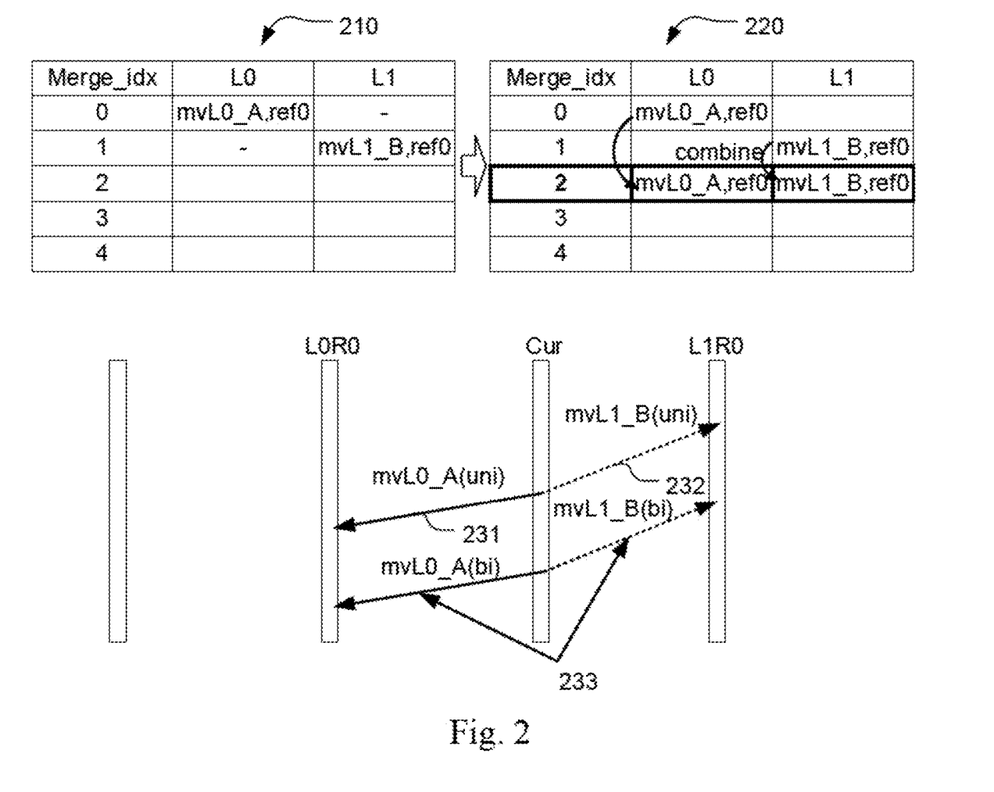
FIG. 2 illustrates an example of the derivation process for combined bi-predictive Merge candidate.

In candidate type 1, combined bi-predictive Merge candidates are created by combining original Merge candidate. In particular, two candidates in original candidates, which have mvL0 (the motion vector in list 0) and refIdxL0 (the reference picture index in list 0) or mvL1 (the motion vector in list 1) and refIdxL1 (the reference picture index in list 1), are used to created bi-predictive Merge candidates. FIG. 2 illustrates an example of the derivation process for combined bi-predictive Merge candidate. The candidate set 210 corresponds to an original candidate list, which includes mvL0_A, ref0 (231) in L0 and mvL1_B, ref (232) in L1. A bi-prediction MVP 233 can be formed by combining the candidates in L0 and L1.

Figure 3:
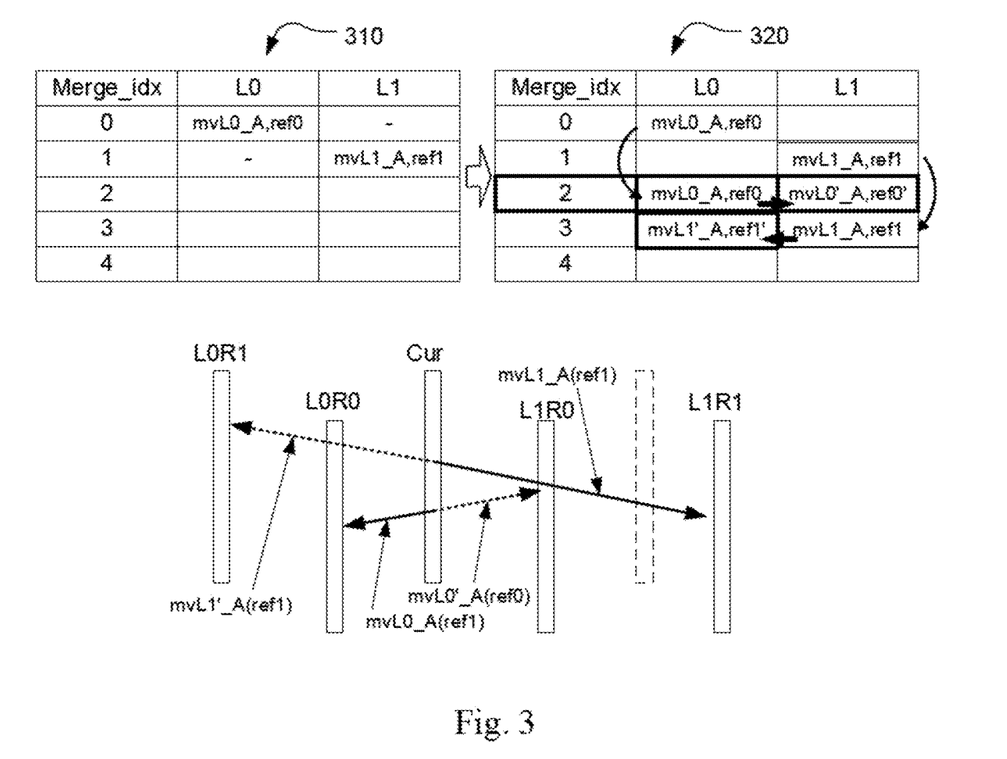
FIG. 3 illustrates an example of the derivation process of the scaled bi-predictive Merge candidate, where candidate list on the left corresponds to an original candidate list and the candidate list on the right corresponds to the expanded candidate list including two generated bi-prediction MVPs.

In candidate type 2, scaled bi-predictive Merge candidates are created by scaling original Merge candidate. In particular, one candidate in original candidates, which have mvLX (the motion vector in list X) and refIdxLX (the reference picture index in list X), X can be 0 or 1, is used to created bi-predictive Merge candidates. For example, one candidate A is list 0 uni-predictive with mvL0'_A and ref0, ref0 is firstly copied to reference index ref0' in list 1. After that, mvL0'_A is calculated by scaling mvL0_A with ref0' and ref0'. Then, bi-predictive Merge candidate which has mvL0_A and ref0 in list 0 and mvL0'_A and ref0' in list 1, is created and added into Merge candidate list. An example of the derivation process of the scaled bi-predictive Merge candidate is shown in FIG. 3, where candidate list 310 corresponds to an original candidate list and candidate list 320 corresponds to the expanded candidate list including two generated bi-prediction MVPs.

Figure 4A:
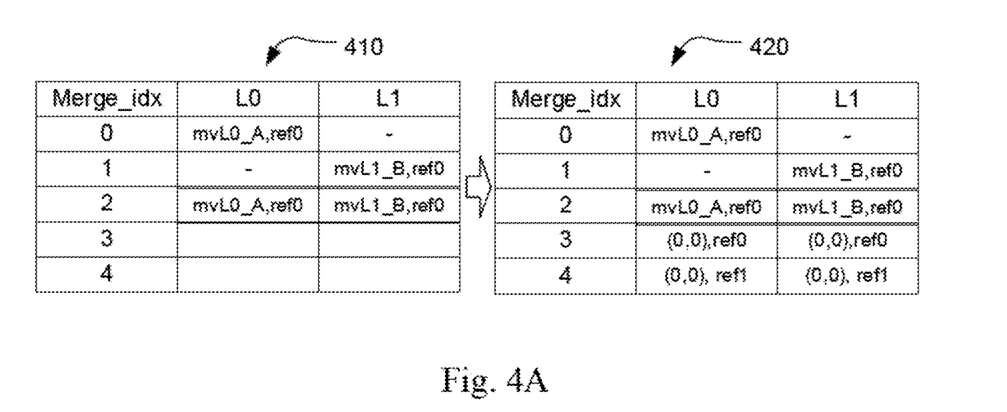
FIG. 4A illustrates an example of adding zero vector Merge candidates, where the candidate list on the left corresponds to an original Merge candidate list and the candidate list on the right corresponds to the extended Merge candidate list by adding zero candidates.
Figure 4B:
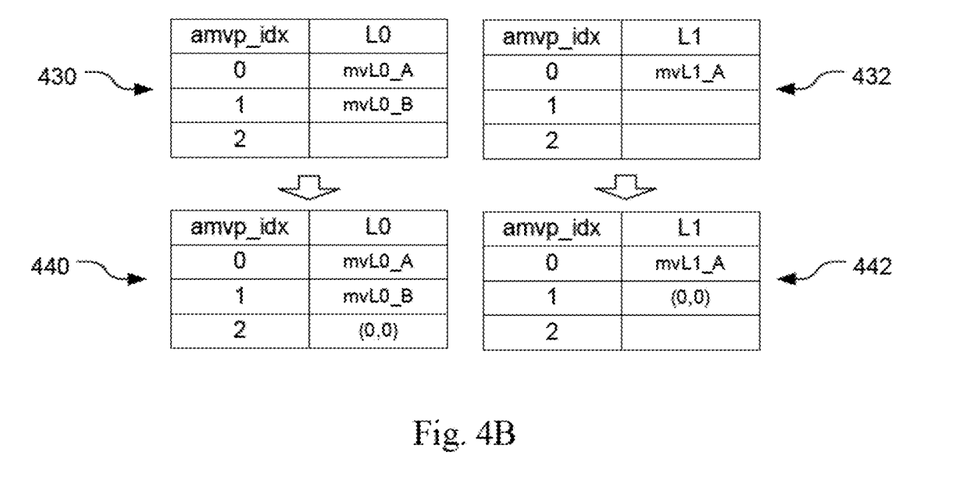
FIG. 4B illustrates an example for adding zero vector AMVP candidates, where the candidate lists on the top correspond to original AMVP candidate lists (L0 on the left and L1 on the right) and the candidate lists at the bottom correspond to the extended AMVP candidate lists (L0 on the left and L1 on the right) by adding zero candidates.

In candidate type 3, Zero vector Merge/AMVP candidates are created by combining zero vectors and reference index, which can be referred. FIG. 4A illustrates an example for adding zero vector Merge candidates, where candidate list 410 corresponds to an original Merge candidate list and candidate list 420 corresponds to the extended Merge candidate list by adding zero candidates. FIG. 4B illustrates an example for adding zero vector AMVP candidates, where candidate lists 430 (L0) and 432 (L1) correspond to original AMVP candidate lists and the candidate list 440 (L0) and 442 (L1) correspond to the extended AMVP candidate lists by adding zero candidates. If zero vector candidates are not duplicated, it is added to Merge/AMVP candidates list.

Figure 5:
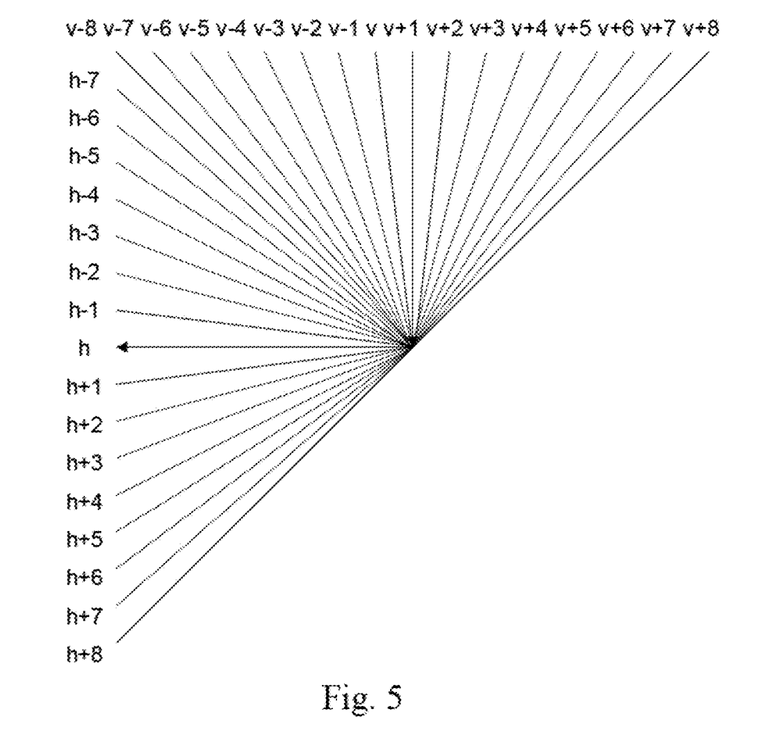
FIG. 5 illustrates the 33 directional Intra prediction mode as used by the HEVC (high efficiency video coding) standard.

When a PU is coded in Intra mode, the Intra prediction method only exploits one reference tier (or line) adjacent to the current prediction unit (PU) and one of the Intra prediction modes to generate the predictors for the current PU. The reference tier adjacent to the current prediction unit (PU) means the reference L-shape reconstructed samples, which are used for Intra prediction. For Intra prediction modes, the spatial neighboring reconstructed pixels can be used to generate the directional prediction. There are up to 35 directions in HEVC. Out of all 35 Intra prediction modes in HEVC, 3 modes are considered as most probable modes (MPM) for predicting the Intra prediction mode in the current prediction block. Three modes selected as the MPM set. For example, the MPM set comprises the Intra prediction modes used in the left prediction block and in the above prediction block. In case that the Intra prediction modes in two neighboring blocks are identical and both directional, or only one of the two neighboring blocks is available and coded in Intra prediction and at the same time this Intra prediction mode is directional, two neighboring directions immediately next to this direction is also used in MPM. DC mode and Planar mode are also considered in MPM set to fill the available spot in the MPM, especially if the above or top neighboring blocks are not available or not coded in Intra prediction, or the Intra prediction modes in neighboring blocks are not directional. If the Intra prediction mode for current prediction block is one of the modes in the MPM set, 1 or 2 bins is used to signal which one it is. Otherwise, it is not the same as any entry in the MPM set, it will be coded as a non-MPM mode. There are all-together 32 such non-MPM modes and a (5-bit) fixed length coding method is applied to signal this mode. The 33 directions are illustrated in FIG. 5. In FIG. 5, there are all together 33 directional modes, so H, H+1~H+8, H−1~H−7, V, V+1~V+8, V−1~V−8 are used. This system can be expanded to a general case, where horizontal and vertical modes are represented as H and V modes. For other directional modes, they can be represented either as H+k or V+k modes, where k=±1, ±2, etc. For example, if 65 directional modes are used, k can be range from ±1 to ±16.

Intra Sub-Partitions (ISP)

Figure 6A:
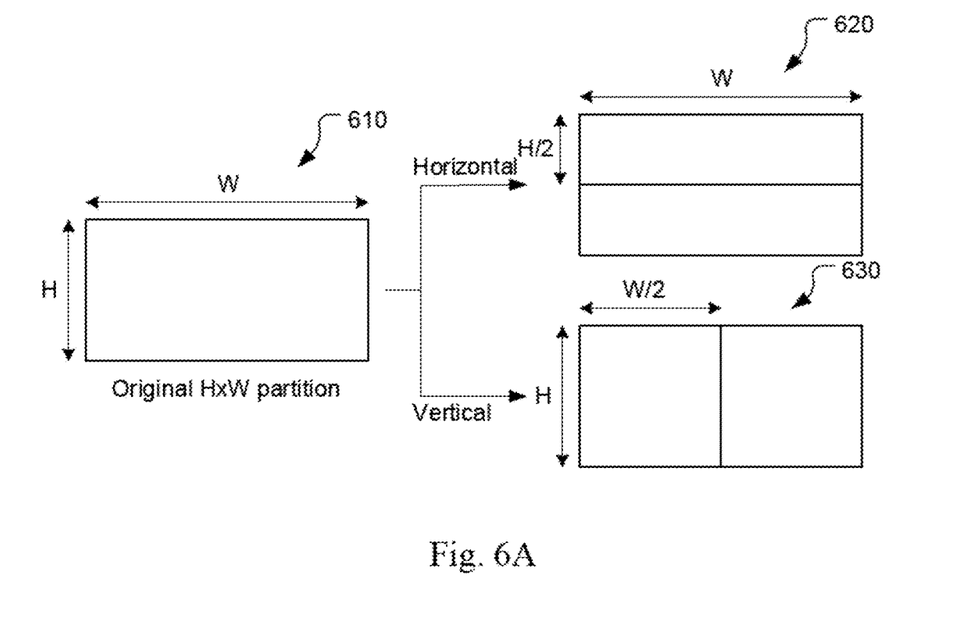
FIG. 6A show an example of the Intra Sub-Partitions (ISP) coding mode by partitioning a block into two sub-blocks horizontally or vertically.
Figure 6B:
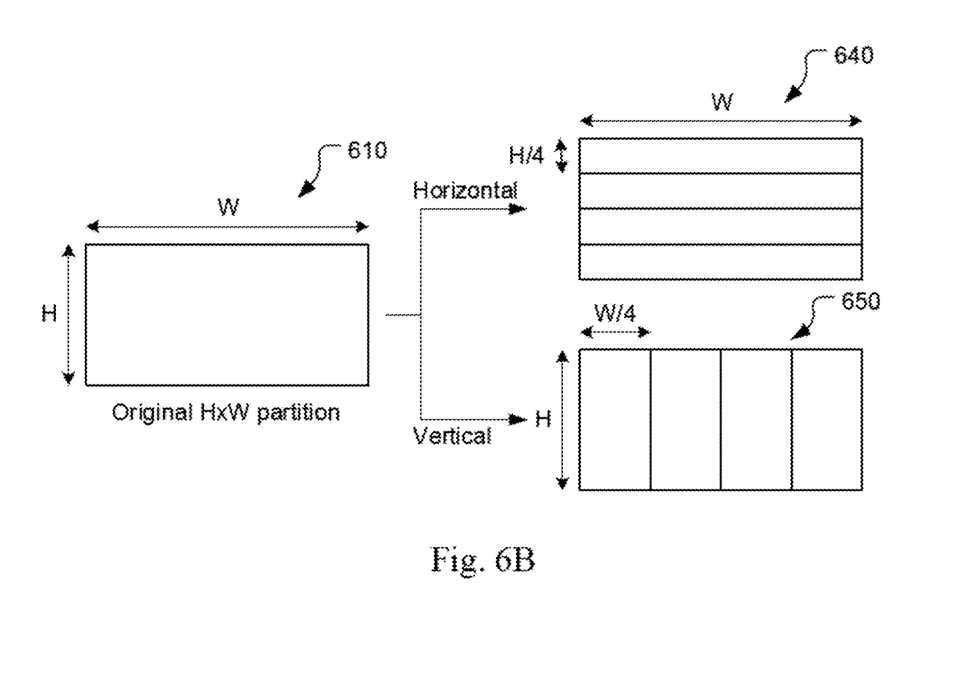
FIG. 6B show an example of the Intra Sub-Partitions (ISP) coding mode by partitioning a block into four sub-blocks horizontally or vertically.

In JVET-M0102, the Intra Sub-Partitions (ISP) coding mode is an updated version of the Line-Based Intra (LIP) coding that corrects the hardware-related issues of the previous design of the algorithm. The ISP tool divides luma intra-predicted blocks vertically or horizontally into 2 or 4 sub-partitions depending on the block size dimensions, as shown in Table 1. FIG. 6A and FIG. 6B show examples of the two possibilities. In FIG. 6A, an H×W block 610 is partitioned into two H/2×W blocks 620 (i.e., horizontal partition) or two H×W/2 blocks 630 (i.e., vertical partition). For example, the block can be a 4×8 block or an 8×4 block. In FIG. 6B, an H×W block 610 is partitioned into four H/4×W blocks 640 (i.e., horizontal partition) or four H×W/4 blocks 650 (i.e., vertical partition) except for 4×8, 8×4 and 4×4 blocks. All sub-partitions fulfil the condition of having at least 16 samples.

TABLE 1

Number of sub-partitions depending on the block size

| Block Size | Number of Sub-Partitions |
| --- | --- |
| 4 × 4 | Not divided |
| 4 × 8 and 8 × 4 | 2 |
| All other cases | 4 |

For each of these sub-partitions, a residual signal is generated by entropy decoding the coefficients sent by the encoder and then inverse quantizing and inverse transforming them. Then, the sub-partition is Intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same Intra mode.

Based on the Intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

Triangular Prediction Unit Mode Technique

Figure 7:
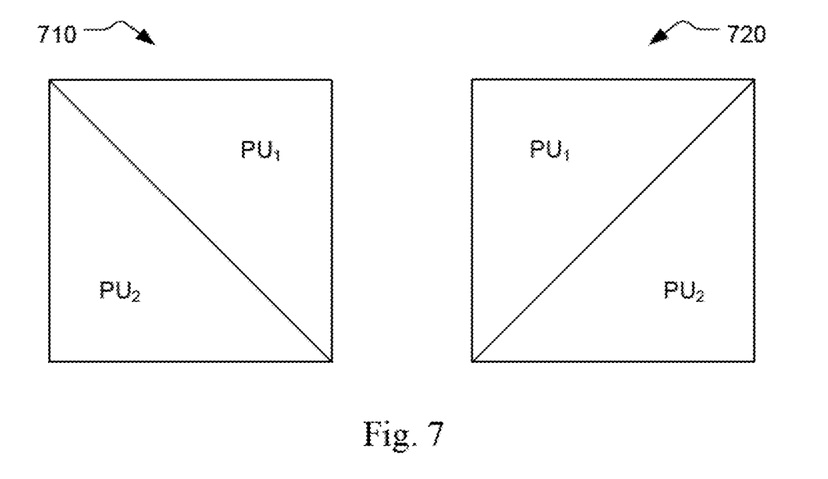
FIG. 7 illustrates an example of TPM (Triangular Prediction Mode), where a CU is split into two triangular prediction units, in either diagonal or inverse diagonal direction. Each triangular prediction unit in the CU is Inter-predicted using its own uni-prediction motion vector and reference frame index to generate prediction from a uni-prediction candidate.

In JVET-L0124 (R.-L. Liao, et al., "CE10.3.1.b: Triangular prediction unit mode," ITU-T SG 16 WP 3 and ISO/IEC JTC 1/SC 29/WG 11, 12th Meeting: Macao, CN, October 2018, Document: JVET-L0124) and JVET-L0208 (T. Poirier, et al., "CE10 related: multiple prediction unit shapes," ITU-T SG 16 WP 3 and ISO/IEC JTC 1/SC 29/WG 11, 12th Meeting: Macao, CN, October 2018, Document: JVET-L0208), the concept of the triangular prediction unit mode is introduced for motion compensated prediction. As shown in FIG. 7, it splits a CU into two triangular prediction units, in either diagonal 710 or inverse diagonal direction 720. Each triangular prediction unit in the CU is inter-predicted using its own uni-prediction motion vector and reference frame index to generate prediction from a uni-prediction candidate. An adaptive weighting process is performed to the adjacent edge (e.g. diagonal edge) after predicting the triangular prediction units to get the final prediction of current CU. Then, the transform and quantization process are applied to the whole CU. It is noted that this mode is only applied to Skip and/or Merge modes. The triangular prediction unit mode is also referred as triangle partition mode or triangle Merge mode in this disclosure. Triangle Merge mode can be extended to splitting whole CU into two partitions (also referred to as two regions) with a partition straight line, represented by an angle and/or a distance between the partition straight line and CU center.

Adaptive Weighting Process

After predicting each triangular prediction unit, an adaptive weighting process is applied to the diagonal edge between the two triangular prediction units to derive the final prediction for the whole CU. Two weighting factor groups are listed as follows:

First weighting factor group: {7/8, 6/8, 4/8, 2/8, 1/8} and {7/8, 4/8, 1/8} is used for the luminance and the chrominance samples, respectively;

Second weighting factor group: {7/8, 6/8, 5/8, 4/8, 3/8, 2/8, 1/8} and {6/8, 4/8, 2/8} are used for the luminance and the chrominance samples, respectively.

Figure 8:
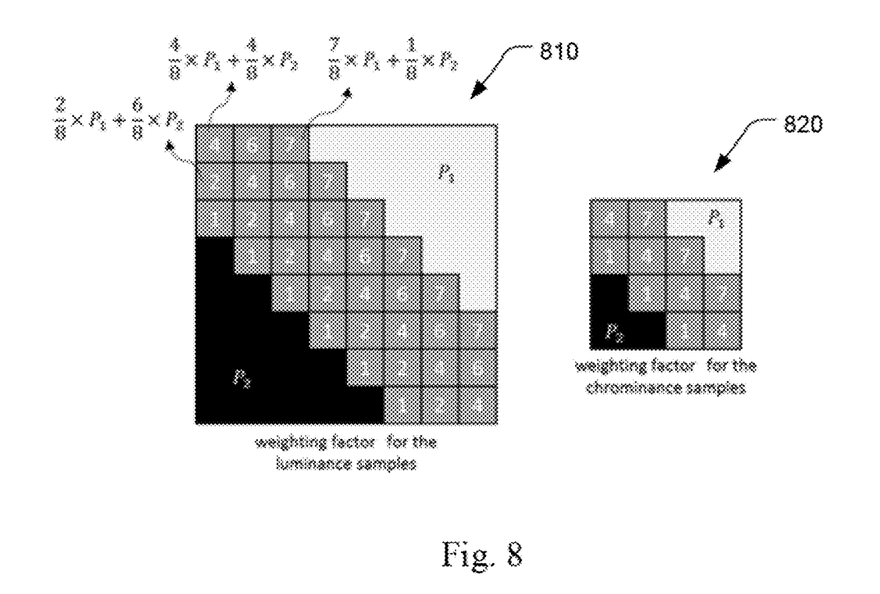
FIG. 8 illustrates an example of adaptive weighting process, where weightings are shown for the luma block (left) and the chroma block (right).

One weighting factor group is selected based on the comparison of the motion vectors of two triangular prediction units. The second weighting factor group is used when the reference pictures of the two triangular prediction units are different from each other or their motion vector difference is larger than 16 pixels. Otherwise, the first weighting factor group is used. An example is shown in FIG. 8, where weightings 810 are shown for the luma block and weightings 820 are shown for the chroma block. A more detailed explanation of the algorithm can be found in JVET-L0124 and JVET-L0208.

In VTM3 (J. Chen, et al., "Algorithm description for Versatile Video Coding and Test Model 3 (VTM 3)," ITU-T SG 16 WP 3 and ISO/IEC JTC 1/SC 29/WG 11, 12th Meeting: Macao, CN, October 2018, Document: JVET-L1002), when a CU is coded in Merge mode, and if the CU contains at least 64 luma samples (i.e., CU width times CU height equal to or larger than 64), an additional flag is signaled to indicate whether the combined Inter/Intra prediction (CIIP) mode is applied to the current CU. In order to form the CIIP prediction, an Intra prediction mode is first derived from two additional syntax elements. Up to four possible Intra prediction modes can be used: DC, planar, horizontal, or vertical. Then, the Inter prediction and Intra prediction signals are derived using regular Intra and Inter decoding processes. Finally, weighted averaging of the Inter and Intra prediction signals is performed to obtain the CIIP prediction. A more detailed explanation of the algorithm can be found in JVET-L0100 (M.-S. Chiang, et al., "CE10.1.1: Multi-hypothesis prediction for improving AMVP mode, skip or merge mode, and Intra mode," ITU-T SG 16 WP 3 and ISO/IEC JTC 1/SC 29/WG 11, 12th Meeting: Macao, CN, October 2018, Document: JVET-L0100).

History-Based MVP (HMVP)

Figure 9:
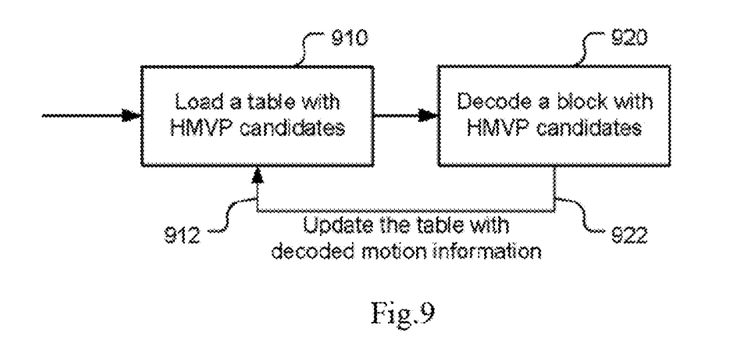
FIG. 9 illustrates an example of History-based MVP (HMVP), where the HMVP candidates are loaded into a table and the HMVP candidates are used to decode a block.

A history-based MVP (HMVP) method is disclosed in JVET-L0266 (L. Zhang, et al., "CE4: History-based Motion Vector Prediction (Test 4.4.7)," ITU-T SG 16 WP 3 and ISO/IEC JTC 1/SC 29/WG 11, 12th Meeting: Macao, CN, October 2018, Document: JVET-L0266), wherein an HMVP candidate is defined as the motion information of a previously coded block. A table with multiple HMVP candidates is maintained during the encoding/decoding process. The table is emptied when a new slice is encountered. Whenever there is an Inter-coded non-affine block, the associated motion information is added to the last entry of the table as a new HMVP candidate. The overall coding flow is depicted in FIG. 9, where the HMVP candidates are loaded into a table in step 910 and the HMVP candidates are used to decode a block in step 920. The step 920 will generate decoded motion 922, which is used to update the table, i.e., being used as an input 912 to step 910 for updating the table.

Figure 10:
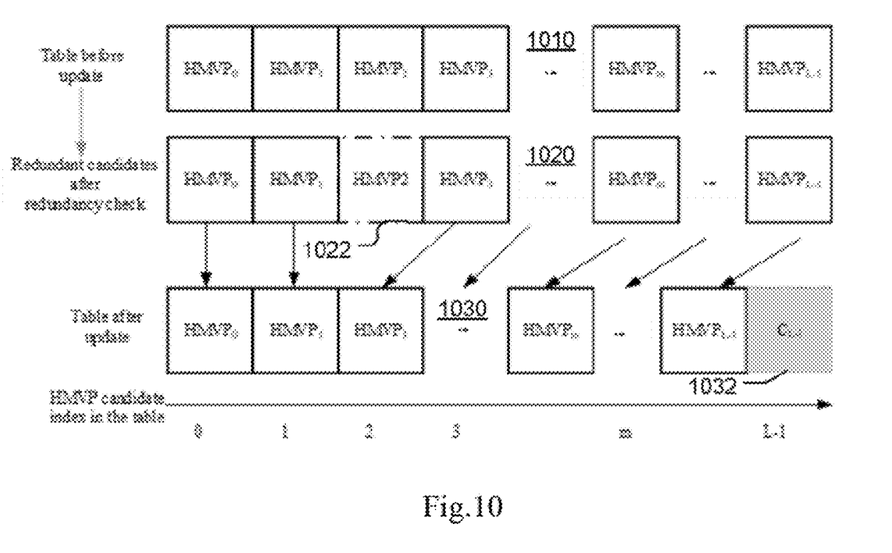
FIG. 10 illustrates an example of updating the HMVP (History-based Motion Vector Prediction) table according to the HMVP method.

FIG. 10 illustrates an example of updating the table according to the HMVP method. The HMVPs in table 1010 correspond to the HMVPs before update. The HMVPs in table 1020 correspond to the HMVPs after redundancy check, where HMVP2 1022 corresponds to a redundant HMVP. The HMVPs in table 1030 correspond to the HMVPs after update, where $C_{L-1}$ 1032 corresponds to an HMVP to be added.

In JVET-L0266, the table size S is set to be 6, which indicates that up to 6 HMVP candidates may be added to the table. When inserting a new motion candidate to the table, a constrained FIFO rule is utilized wherein redundancy check is firstly applied to find whether there is an identical HMVP in the table. If found, the identical HMVP (i.e., a redundant HMVP) is removed from the table and all the HMVP candidates afterwards are moved forward, i.e., with indices reduced by 1.

HMVP candidates can be used in the Merge candidate list construction process. The latest several HMVP candidates in the table are checked in order and inserted to the candidate list after the TMVP candidate. Pruning is applied on the HMVP candidates corresponding to the spatial or temporal Merge candidate to exclude sub-block motion candidate (i.e., ATMVP).

To reduce the number of pruning operations, three simplifications are introduced:

Method 1:

Number of HMPV candidates to be checked, as denoted by L, is set as follows:

$$L=(N<=4)?M:(8-N), \quad (1)$$

where N indicates the number of available non-sub block Merge candidates and M indicates the number of available HMVP candidates in the table.

Method 2:

In addition, once the total number of available Merge candidates reaches the signaled maximum allowed Merge candidates minus 1, the Merge candidate list construction process from HMVP list is terminated.

Method 3:

Moreover, the number of pairs for combined bi-predictive Merge candidate derivation is reduced from 12 to 6.

Similarly, HMVP candidates can also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In JVET-L0266, K is set to 4 while the AMVP list size is kept unchanged, i.e., equal to 2.

A more detailed explanation of the algorithm can be found in JVET-L0266 and JVET-L0208.

In the present invention, combinations and variations of Inter/Intra coding tools such as ISP, CIIP and TPM are disclosed to improve the performance and/or reduce the complexity.

SUMMARY

A method and apparatus of prediction for video coding are disclosed. According to this method, input data related to a current block in a current picture is received at a video encoder side or a video bitstream corresponding to compressed data including the current block in the current picture is received at a video decoder side. The current block is partitioned into a first region and a second region using a target partition selected from a partition set comprising triangle partition. A Merge candidate list for partitioned current block is determined by including at least one HMVP (history-based motion vector prediction) candidate from an HMVP buffer, where the HMVP buffer stores motion information of one or more previously coded blocks. The partitioned current block or current motion information associated with the partitioned current block is encoded using the Merge candidate list at the video encoder side, or the partitioned current block or the current motion information associated with the partitioned current block is decoded using the Merge candidate list at the video decoder side, where the Merge candidate list is used to derive a first candidate for the first region and a second candidate for the second region.

In one embodiment, one or more HMVP candidates from the HMVP buffer are inserted into the Merge candidate list following a rule for inserting said one or more HMVP candidates into a regular Merge candidate list. For example, one or more stored candidates in the HMVP buffer can be inserted to the Merge candidate list according to an order of said one or more stored candidates in the HMVP buffer. Furthermore, a target stored candidate in a first position of the HMVP buffer can be inserted at a first candidate position of the Merge candidate list. In another example, one or more stored candidates in the HMVP buffer can be inserted to the Merge candidate list according to a reverse order of said one or more stored candidates in the HMVP buffer. For example, a target stored candidate in a last position of the HMVP buffer can be inserted at a first candidate position of the Merge candidate list.

According to another embodiment, the Merge candidate list comprises one or more regular Merge candidates, and wherein each regular Merge candidate belongs to a prediction group comprising uni-prediction and bi-prediction.

In yet another embodiment, last N candidates in the HMVP buffer are used to derive one or more HMVP candidates for the Merge candidate list, and wherein N is a positive integer. In one embodiment, the N is implicitly determined. In another embodiment, the N is signaled at CU (coding unit), CTU (coding tree unit), slice, tile, tile group, SPS (sequence parameter set), or PPS (picture parameter set) level.

According to another method, when the triangular CIIP is applied to the current block, the current block is partitioned into a first region and a second region using a triangle partition; an Inter predictor is determined for the first region; an Intra predictor is determined for the second region; and the first region is encoded or decoded using the Inter predictor and the second region is encoded or decoded using the Intra predictor.

In one embodiment, an index indicating whether TPM (triangle prediction mode) or CIIP is applied is signaled at an encoder side or parsed at a decoder side. The index is signaled at the video encoder side or parsed at the video decoder side in a CU (coding unit), CTU (coding tree unit), slice, tile, tile group, SPS (sequence parameter set), or PPS (picture parameter set) level.

In one embodiment, a blending process is performed on an adjacent area of the first region and the second region.

In another embodiment, a triangular CIIP predictor corresponding to the Inter predictor for the first region and the Intra predictor for the second region is added to a candidate list for TPM (triangle prediction mode). The triangular CIIP predictor is used to replace one or more even-numbered candidates or odd-numbered candidates in the candidate list.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

CIIP mode is intended to improve the Inter prediction by combining one additional hypothesis of Intra prediction with the existing Merge prediction and can be treated as a normal Intra mode, a normal Inter mode or a new combined mode. In this invention, the Intra prediction can be generated from the HEVC-like Intra mode or HEVC-like Intra mode plus one or more newly developed coding tools. The new tools can be 67 Intra prediction modes, ISP mode, or any combination of the above. When the Intra prediction for CIIP mode is from ISP, the flow is described as Steps 1 to 4 as follows.

Step 1: One CU is Inter predicted and the Inter prediction is stored in a buffer.

Step 2: The CU is spit into sub-partitions according to the rule of ISP mode and the Inter prediction for the whole CU is also split accordingly.

Step 3: The Intra prediction for each sub-partition is then generated on a sub-partition by sub-partition basis; when generating the Intra prediction for the first sub-partition, the reconstructed samples from the neighbors are referenced; the Intra prediction for the current sub-partition is added to the corresponding Inter prediction with weighting, the combined prediction can be processed with transforms for Intra or Inter and then get the residuals and reconstructions; when generating the Intra prediction for the following sub-partition, the referenced samples can come from the previous sub-partition and/or from neighbors.

Step 4: Repeat Step 3 and finally, the whole CU can be reconstructed. In one embodiment, the weighting can follow the original CIIP table.

In another embodiment, the weighting table can be different from that for the original CIIP mode. In another embodiment, the weighting can be equal weights. In another embodiment, the transform process for CIIP with ISP can follow the transform for Intra or Inter. In another embodiment, CIIP with ISP can be treated as a normal Intra, Inter or a new combined mode. Some variances of CIIP mode can be designed with applied-portion settings, applied-weighting settings, signaling settings, or any combination of the above. In one embodiment, those settings can be implicitly decided according to the block width, block height or block area. In another embodiment, those settings can be explicitly decided according to signaling at CU, CTU, slice, tile, tile group, SPS, or PPS level.

Figure 11:
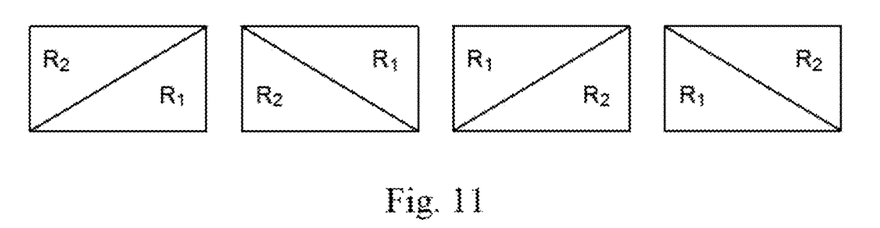
FIG. 11 illustrates examples of $R_1$ and $R_2$ partitions to apply Intra prediction and Inter prediction to the whole block.

Applied-portion settings mean that the Intra prediction for CIIP can be applied to the predefined region $R_1$ within the block and the Inter prediction for CIIP can be applied to another predefined region $R_2$ within the block. FIG. 11 illustrates examples of $R_1$ and $R_2$ partitions (1110-1140) to apply Intra prediction and Inter prediction to the whole block.

When $R_1$ or $R_2$ is triangle, this kind of CIIP variance is called as triangle CIIP in the present invention. In one embodiment, one or more kinds of triangle CIIP can be used. In another embodiment, one additional index following the flag (representing whether CIIP is applied or not) or the flag (representing whether TPM is applied or not) can be signaled to indicate whether or which triangle CIIP is applied. In another embodiment, triangle CIIP can be treated as an extended TPM. The triangle CIIP candidates can be added into the candidate list for TPM. In another embodiment, triangle CIIP candidates can replace some of the existing candidates for TPM. For example, the candidates for TPM with even or odd indices can be replaced with the candidates for triangle CIIP.

In another embodiment, when applied-portion settings are used to generate different variances for CIIP, the number of Intra prediction modes for CIIP is reduced. When the number of the Intra prediction modes is reduced to 1, it is not required to signal for selecting the Intra prediction mode for CIIP. For example, the Intra prediction mode list for CIIP can be the subset of {planar, DC, horizontal, vertical}. For another example, the Intra prediction mode list for CIIP can be only one of {planar, DC, horizontal, vertical}. In another embodiment, the blending process can be performed on the adjacent area of the Intra prediction and the Inter prediction just like what TPM does. For example, first weighting factor group and second weighting factor group are used. For another example, only first weighting factor group or second weighting factor group is used. For another example, one of first weighting factor group and second weighting factor group is used according to a predefined rule. The predefined rule can be implicitly decided according to the block width or block height or block area, or explicitly decided by a flag signaled at CU, CTU, slice, tile, tile group, SPS, or PPS level.

In another embodiment, for the adjacent area of the Intra prediction and Inter prediction, the blending weights can be sub-block based. In each sub-block, the weights for the samples are the same. The width or height for each sub-block can be 2, 4, 8, 16, 32, or any combination of the above. In another embodiment, the blending weights vary according to the Intra prediction mode or block width or height. For example, when the Intra prediction mode is not an angular mode, equal weights are applied. For another example, when the block width, height or area is larger than or smaller than a predefined threshold, such as 2, 4, 6, 8, 16, 32, 64, 128, 256, 512, or 1024, equal weights are applied.

Applied-weighting settings mean the weights for the Intra prediction and Inter prediction, denoted as wIntra and wInter, respectively, can be explicitly signaled with a flag at CU, CTU, slice, tile, tile group, SPS, or PPS level. If the combined prediction is calculated by right-shifting 3 bits for the weighted summation of Intra prediction and Inter prediction. The multiple candidates for (wIntra, wInter) can be fixed at (4, 4), (2, 6), (6, 2) or vary with the selected Intra prediction mode or the sample position. In one embodiment, when the weighting for combining Intra prediction and Inter prediction is explicitly signaled, the number of Intra prediction modes for CIIP is reduced. When the number of the Intra prediction modes is reduced to 1, it is not required to signal for the selecting the Intra prediction mode for CIIP. For example, the Intra prediction mode list for CIIP can be the subset of {planar, DC, horizontal, vertical}. For another example, the Intra prediction mode list for CIIP can be only one of {planar, DC, horizontal, vertical}. As shown in the following, for the samples located at $R_1$, (wIntra, wInter) can be set to be (8, 0) and for the samples located at $R_2$, (wIntra, wInter) can be set to be (0, 8). These kinds of CIIP are called as triangle CIIP.

In one embodiment, one or more than one kinds of weights for CIIP can be used. The weighting with the smaller index can be signaled with the less coding bins. For example, weighting index 0 means (wIntra, wInter)=(4, 4); weighting index 1 means (wIntra, wInter)=(2, 6); weighting index 0 means (wIntra, wInter)=(6, 2); the remaining weighting indices mean different kinds of triangle CIIP. In another embodiment, the weighting index 0 is to indicate (wIntra, wInter)=(4, 4) and signaled with the least coding bins compared to other weightings. In another embodiment, the blending process can be performed on the adjacent area of the Intra prediction and the Interprediction just like what TPM. For example, first weighting factor group and second weighting factor group are used. For another example, only first weighting factor group or second weighting factor group is used. For another example, one of first weighting factor group and second weighting factor group is used according to a predefined rule. The predefined rule can be implicitly decided according to the block width or block height or block area, or explicitly decided by a flag signaled at CU, CTU, slice, tile, tile group, SPS, or PPS level. In another embodiment, for the adjacent area of the Intra prediction and Interprediction, the blending weights can be sub-block based. In each sub-block, the weights for per sample are the same. The width or height for each sub-block can be 2, 4, 8, 16, 32, or any combination of the above. In another embodiment, the blending weights vary with the Intra prediction mode, block width or height. For example, when the Intra prediction mode is not an angular mode, equal weights are applied. For another example, when the block width, height or area is larger than or smaller than a predefined threshold, such as 2, 4, 6, 8, 16, 32, 64, 128, 256, 512, or 1024, equal weights are applied.

Signaling settings mean that different signaling methods for CIIP with different settings are designed. In one embodiment, one CIIP index is signaled to indicate multiple variances of CIIP. CIIP index 0 indicates the original design, to apply Intra prediction and Interprediction for the whole block with weighted average. The remaining CIIP indices indicate the extended versions of CIIP. CIIP index 0 can be signaled with the shortest codeword among all CIIP indices. In another embodiment, different settings can be signaled separately with their own indices. For example, if the applied-portion settings and/or applied-weighting settings are used, one index is signaled to indicate the selected partition shape and/or another index is signaled to indicate the selected weighting.

Any combination of above can be applied to any tools such as ISP, CIIP, or TPM.

In the present invention, different methods of improving or simplifying CIIP or triangular prediction unit mode (TPM) are also disclosed.

CIIP mode is to improve the Inter prediction by combining one additional hypothesis of Intra prediction with the existing Merge prediction and can be treated as a normal Intra mode, a normal Inter mode or a new combined mode. In this invention, the Intra prediction can be generated from the HEVC-like Intra mode or HEVC-like Intra mode plus one or more new-developed tools. The new developed tools can be 67 Intra prediction modes, ISP mode, or any combination of above. When the Intra prediction for CIIP mode is from ISP, the flow is described in the following steps:

Step 1: One CU is Inter predicted and the Inter prediction is stored in a buffer.

Step 2: At the same time, the CU is spit into sub-partitions and the Intra prediction for each sub-partition is generated according to the rule of ISP mode. The Intra prediction for each sub-partition can be generated one sub-partition by one sub-partition as follows:

Step 2.1: The Intra prediction for the first sub-partition can reference the reconstructed samples from the neighbors.

Step 2.2: Intra transform process is then applied to generate the residuals, denoted as $Resi_{intra}$, and reconstruction, denoted as $Reco_{intra}$, for the first sub-partition.

Step 2.3: The Intra prediction of the following sub-partition can be obtained by referencing $Reco_{intra}$ for the previous sub-partition and/or the reconstruction from the neighbors. Repeat Step 2.3 and the whole CU reconstruction from the Intra process can be obtained as what original ISP mode does.

Finally, the CU can be reconstructed by adding the Inter prediction and the Intra reconstruction with weighting. In one embodiment, the weighting can follow the original CIIP weighting table. In another embodiment, the weighting table can be different from that for the original CIIP mode. In another embodiment, the weighting can be equal weights. In another embodiment, CIIP with ISP can be treated as a normal Intra or Inter or a new combined mode.

TPM introduces a new triangular partition for motion compensated prediction. Each candidate for TPM indicates one uni-prediction motion candidate for $PU_1$ and another one uni-prediction motion candidate for $PU_2$. In one embodiment, the candidates for TPM can be generated from the Merge candidates for regular Merge mode, where each Merge candidate can be uni-prediction or bi-prediction. In another embodiment, the candidates for TPM can be generated from the motion candidates in HMVP buffer, where each motion candidate can be uni-prediction or bi-prediction. For example, the last N candidates in HMVP buffer are available for generating TPM candidates, where N is a positive integer, such as 1, 2, 3, 4, 5, 6, 7, or 8. N can be fixed or implicitly derived according to the block width, height, area or explicitly signaled at CU, CTU, slice, tile, tile group, SPS, or PPS level.

In another example, the HMVP candidates for TPM follows the rule of the HMVP candidates for regular merge mode. In one example, the last inserted candidate in the HMVP buffer is the first candidate for the TPM candidates. For example, the reversed order in HMVP is used. In another example, the first inserted candidate in the HMVP buffer is the first candidate for the TPM candidates. For example, the same order in HMVP is used. In another example, part of the candidates in HMVP can be used as or used to derive the TMP candidates. For example, the even index of the HMVP candidates are used as or used to derive TMP candidates. For another example, all HMVP candidates are available for generating TPM candidates. For another example, the non-sub block Merge candidates in HMVP buffer are available for generating TPM candidates. Any combination of the above examples can be applied.

In one embodiment, all or part of the HMVP candidates are used to derive TPM candidates. The uni-prediction candidate is preserved and keeps unchanged. The bi-prediction candidate is modified to be a uni-prediction candidate. For example, the List_0 motion information is preserved and the List_1 motion information is set as unavailable. The bi-prediction candidate is modified as a List_0 uni-prediction candidate. In another example, the List_1 motion information is preserved and the List_0 motion information is set as unavailable. The bi-prediction candidate is modified as a List_1 uni-prediction candidate. In another example, two candidates in the HMVP candidate list are selected for these two partitions. If the selected candidate is a bi-prediction candidate, it is modified to a uni-prediction candidate. In one example, for the selected first candidate, if the L0 MV is available, the L0 MV is used. Otherwise, the L1 MV is used. For the selected second candidate, if the L1 MV is available, the L1 MV is used. Otherwise, the L0 MV is used. In another example, for the selected first candidate, if the L1 MV is available, the L1 MV is used. Otherwise, the L0 MV is used. For the selected second candidate, if the L0 MV is available, the L0 MV is used. Otherwise, the L1 MV is used.

In one embodiment, if these two candidates are the same, an MV offset (e.g. (one-quarter, 0), is added on one of the candidate, e.g. the second candidate. In another example, two candidates in the HMVP candidate list are selected for these two partitions. If the selected candidate is bi-prediction candidate, it is modified to uni-prediction candidate. In one example, for the selected first candidate, if the L0 MV is available, the L0 MV is used. Otherwise, the L0 MV is derived from the L1 MV. For the selected second candidate, if the L1 MV is available, the L1 MV is used. Otherwise, the L1 MV is derived from the L0 MV. In another example, for the selected first candidate, if the L1 MV is available, the L1 MV is used. Otherwise, the L1 MV is derived from the L0 MV. For the selected second candidate, if the L0 MV is available, the L0 MV is used. Otherwise, the L0 MV is derived from the L1 MV. In one embodiment, if these two candidates are the same, a MV offset (e.g. (one-quarter, 0), is added on one of the candidates, e.g. the second candidate.

In another embodiment, the candidates for TPM can be generated from any subset of {spatial candidates, temporal candidates, HMVP candidates}. One possible flow is described as follows. First of all, a candidate list, composed of uni-prediction motion candidates, is formed and a TPM index is signaled to indicate one combination, including two uni-prediction candidates to predict $PU_1$ and $PU_2$. One Intra mode candidate can be used in the following cases. In one embodiment, when the two uni-prediction candidates in one combination are similar, either one of the two uni-prediction candidates can be replaced with Intra prediction or its Inter prediction can be further added by Intra prediction with weighting. For example, similarity means the two candidates refer to the same reference picture. For another example, similarity means the difference of MV, denoted as $\text{diff}_{mv}$, for the two candidates, is smaller than a pre-determined threshold. $\text{Diff}_{mv}$ can be the $MV_0$ difference between the two candidates plus the $MV_1$ difference between the two candidates. Any combination of the above examples can be applied to decide the similarity.

In another embodiment, when either one of the two candidates in one combination is formed by zero vectors, the motion candidate with zero vector can be replaced with the Intra mode candidate or its Inter prediction can be further added by Intra prediction with weighting. In another embodiment, when the two candidates in one combination are both List 0 or List 1, either one of the two candidates can be replaced with the Intra mode candidate. For example, the motion candidate referring the farther reference picture is replaced with the Intra mode candidate. Another possible flow is described as follows. First of all, a TPM index is signaled to indicate one candidate in the referenced motion candidate list and a rule is pre-defined to change the bi-prediction motion candidate to be valid for TPM. In one embodiment, when the reference pictures for List 0 and List 1 are the same, either one of the $MV_{list0}$ to and $MV_{list1}$ can be replaced with the Intra mode candidate or its Inter prediction can be further added by Intra prediction with weighting. In another embodiment, MV with the pre-defined list, such as list 0 or list 1, can be replaced with the Intra mode candidate or its Inter prediction can be further added by Intra prediction with weighting. Different settings, such as blending settings, weighting settings, block settings, Intra-mode settings, and any combination of above, can be used when both Inter candidate and Intra candidate are used for TPM.

Blending settings mean when the prediction of the whole CU comes from the combination of Intra prediction and Intra prediction, blending process can be applied to the adjacent area. In one embodiment, the blending weights can follow what TPM does. For example, two weighting factor groups can be used according to the block width, block height, block area or explicitly decided by a flag signaled at CU, CTU, slice, tile, tile group, SPS, or PPS level. For another example, the first or second weighting factor group can be always used. For another example, equal weights can be applied. In another embodiment, for the adjacent area of the Intra prediction and Inter prediction, the blending weights can be sub-block based. In each sub-block, the weights for samples are the same. The width or height for each sub-block can be 2, 4, 8, 16, 32, or any combination of the above. In another embodiment, the blending weights vary with the Intra prediction mode or block width or height. For example, when the Intra prediction mode is not an angular mode, equal weights are applied. For another example, when the block width or height or area is larger than or smaller than a predefined threshold, such as 2, 4, 6, 8, 16, 32, 64, 128, 256, 512, or 1024, equal weights are applied.

Weighting settings mean when the Inter prediction is further added by the Intra prediction, a weighted averaging is applied. For example, equal weights are applied. For another example, the weight for Intra prediction gets smaller as the predicted sample gets far away from the referenced sample. In another embodiment, the blending weights vary with the Intra prediction mode, block width or height. For example, when the Intra prediction mode is not an angular mode, equal weights are applied. For another example, when the block width, height or area is larger than or smaller than a predefined threshold, such as 2, 4, 6, 8, 16, 32, 64, 128, 256, 512, or 1024, equal weights are applied.

Block settings mean the Intra mode candidate can be used for TPM when the block width or height satisfies a pre-defined rule. In one embodiment, the pre-defined rule depends on the block area. For example, when the block area is larger than or smaller than a threshold, such as 16, 32, 64, 128, 256, 512, 1024, 2048, or 4096, the Intra mode candidate can be used for TPM. In another embodiment, the pre-defined rule depends on the block width or height. For example, when the block width or height is larger than or smaller than a threshold, such as 16, 32, 64, 128, 256, 512, 1024, 2048, or 4096, the Intra mode candidate can be used for TPM. In another embodiment, the pre-defined rule depends on the ratio of the long side and short side of the block. For example, when the long side is larger than a threshold, such as 16, 32, 64, 128, 256, 512, 1024, 2048, or 4096, multiplied by the short side, the Intra mode candidate can be used for TPM.

Intra mode settings mean to decide the available Intra prediction modes for TPM. If the number of available Intra prediction modes is one, the selected Intra prediction mode can be inferred without signaling; otherwise, the selected Intra prediction mode needs to be implicitly derived or explicit signaled. In one embodiment, only one of {planar, DC, horizontal, vertical} can be used. In another embodiment, the selected Intra prediction mode can be decided based on the block width, height or area. In another embodiment, the number of available Intra prediction modes can vary with the block width, height or area. In one embodiment, any subset of {planar, DC, horizontal, vertical} can be used.

Any combination of above can be applied to any tools such as CIIP or TPM.

Any variances of above can be implicitly decided with the block width, block height or block area, or explicitly decided by a flag signaled at CU, CTU, slice, tile, tile group, SPS, or PPS level.

Any of the foregoing proposed methods can be implemented in encoders and/or decoders. For example, any of the proposed methods can be implemented in an Inter coding module or Intra coding module of an encoder, a motion compensation module, a merge candidate derivation module of a decoder. Alternatively, any of the proposed methods can be implemented as a circuit coupled to the Inter coding module or Intra coding module of an encoder and/or motion compensation module, a merge candidate derivation module of the decoder.

Figure 12:
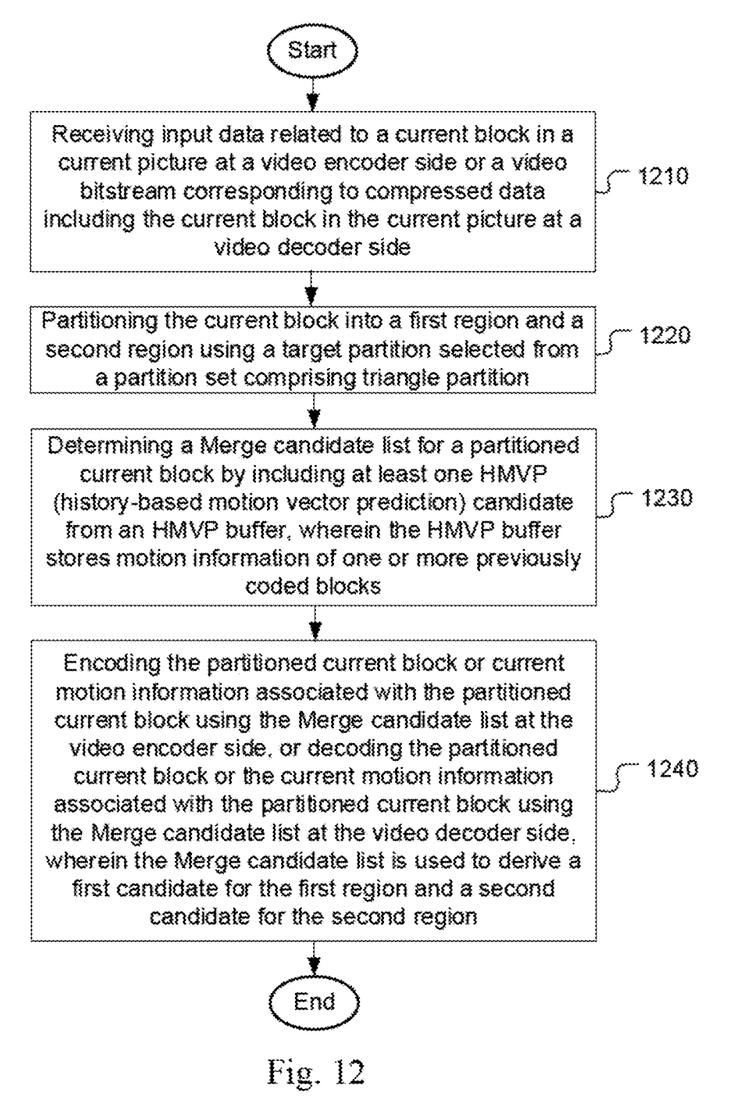
FIG. 12 illustrates a flowchart of an exemplary prediction for video coding according to an embodiment of the present invention, where the triangle partition mode uses an HMVP (History-based Motion Vector Prediction) candidate for a regular Merge list.

FIG. 12 illustrates a flowchart of an exemplary prediction for video coding according to an embodiment of the present invention, where the triangle partition mode uses an HMVP (History-based Motion Vector Prediction) candidate for a regular Merge list. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, input data related to a current block in a current picture is received at a video encoder side or a video bitstream corresponding to compressed data including the current block in the current picture is received at a video decoder side in step 1210. The current block is partitioned into a first region and a second region using a target partition selected from a partition set comprising triangle partition in step 1220. A Merge candidate list is determined for a partitioned current block by including at least one HMVP (history-based motion vector prediction) candidate from an HMVP buffer, wherein the HMVP buffer stores motion information of one or more previously coded blocks in step 1230. The partitioned current block or current motion information associated with the partitioned current block is encoded using the Merge candidate list at the video encoder side, or the partitioned current block or the current motion information associated with the partitioned current block is decoded using the Merge candidate list at the video decoder side, wherein the Merge candidate list is used to derive a first candidate for the first region and a second candidate for the second region in step 1240.

Figure 13:
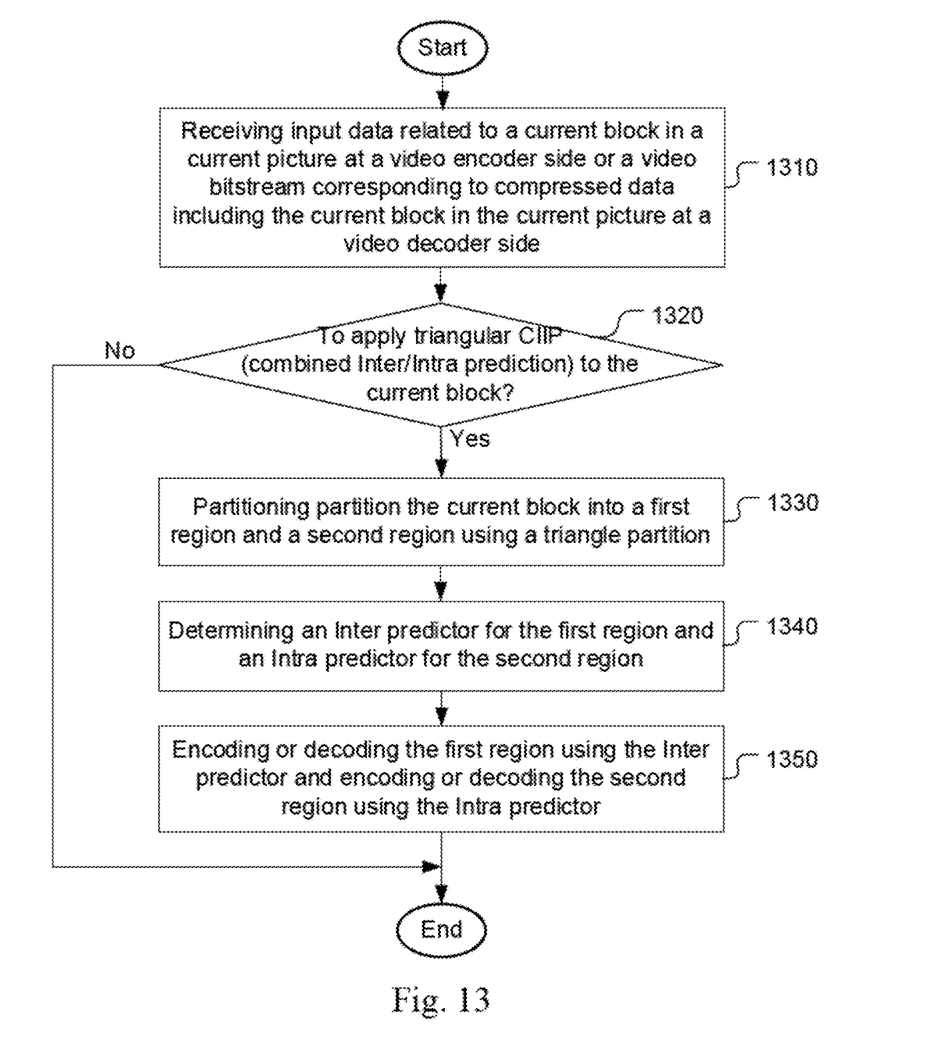
FIG. 13 illustrates a flowchart of an exemplary prediction for video coding according to an embodiment of the present invention, where an index is signaled to indicate whether triangular CIIP is applied.

FIG. 13 illustrates a flowchart of an exemplary prediction for video coding according to an embodiment of the present invention, where an index is signaled to indicate whether triangular CIIP is applied. According to this method, input data related to a current block in a current picture is received at a video encoder side or a video bitstream corresponding to compressed data including the current block in the current picture is received at a video decoder side in step 1310. Whether to apply triangular CIIP (combined Inter/Intra prediction) to the current block is determined in step 1320. If the triangular CIIP is applied to the current block (i.e., the "Yes" path from step 1320), steps 1330 to 1350 are performed. Otherwise (i.e., the "No" path from step 1320), steps 1330 to 1350 are skipped. In step 1330, the current block is partitioned into a first region and a second region using a triangle partition. In step 1340, an Inter predictor is determined for the first region and an Intra predictor is determined for the second region. In step 1350, the first region is encoded or decoded using the Inter predictor and the second region is encoded or decoded using the Intra predictor.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:
1. A method of prediction for video coding, the method comprising:
receiving input data related to a current block in a current picture at a video encoder side or a video bitstream corresponding to compressed data including the current block in the current picture at a video decoder side;

partitioning the current block into a first region and a second region using a target partition selected from a partition set comprising triangle partition;

determining a Merge candidate list for a partitioned current block by including at least one HMVP (history-based motion vector prediction) candidate from an HMVP buffer, wherein the HMVP buffer stores motion information of one or more previously coded blocks; and encoding the partitioned current block or current motion information associated with the partitioned current block using the Merge candidate list at the video encoder side, or decoding the partitioned current block or the current motion information associated with the partitioned current block using the Merge candidate list at the video decoder side, wherein the Merge candidate list is used to derive a first candidate for the first region and a second candidate for the second region, and wherein a triangle prediction mode is enabled when a block width is greater than a first threshold and less than a second threshold, and when a block height is greater than a third threshold and less than a fourth threshold.

2. The method of claim 1, wherein one or more HMVP candidates from the HMVP buffer are inserted into the Merge candidate list following a rule for inserting said one or more HMVP candidates into a regular Merge candidate list.

3. The method of claim 2, wherein one or more stored candidates in the HMVP buffer are inserted to the Merge candidate list according to an order of said one or more stored candidates in the HMVP buffer.

4. The method of claim 3, wherein a target stored candidate in a first position of the HMVP buffer is inserted at a first candidate position of the Merge candidate list.

5. The method of claim 2, wherein one or more stored candidates in the HMVP buffer are inserted to the Merge candidate list according to a reverse order of said one or more stored candidates in the HMVP buffer.

6. The method of claim 5, wherein a target stored candidate in a last position of the HMVP buffer is inserted at a first candidate position of the Merge candidate list.

7. The method of claim 1, wherein the Merge candidate list comprises one or more regular Merge candidates, and wherein each regular Merge candidate belongs to a prediction group comprising uni-prediction and bi-prediction.

8. The method of claim 1, wherein last N candidates in the HMVP buffer are used to derive one or more HMVP candidates for the Merge candidate list, and wherein N is a positive integer.

9. The method of claim 8, wherein the N is implicitly determined.

10. The method of claim 8, wherein the N is signaled at CU (coding unit), CTU (coding tree unit), slice, tile, tile group, SPS (sequence parameter set), or PPS (picture parameter set) level.

11. An apparatus of video coding, the apparatus comprising one or more electronic circuits or processors arranged to:

receive input data related to a current block in a current picture at a video encoder side or a video bitstream corresponding to compressed data including the current block in the current picture at a video decoder side;

partition the current block into a first region and a second region using a target partition selected from a partition set comprising triangle partition;

determine a Merge candidate list for a partitioned current block by including at least one HMVP (history-based motion vector prediction) candidate from an HMVP buffer, wherein the HMVP buffer stores motion information of one or more previously coded blocks; and encode the partitioned current block or current motion information associated with the partitioned current block using the Merge candidate list at the video encoder side, or decode the partitioned current block or the current motion information associated with the partitioned current block using the Merge candidate list at the video decoder side, wherein the Merge candidate list is used to derive a first candidate for the first region and a second candidate for the second region, and wherein a triangle prediction mode is enabled when a block width is greater than a first threshold and less than a second threshold, and when a block height is greater than a third threshold and less than a fourth threshold.

12. A method of prediction for video coding, the method comprising:

receiving input data related to a current block in a current picture at a video encoder side or a video bitstream corresponding to compressed data including the current block in the current picture at a video decoder side;

determining whether to apply triangular CIIP (combined Inter/Intra prediction) to the current block;

if the triangular CIIP is applied to the current block:

partitioning the current block into a first region and a second region using a triangle partition;

determining an Inter predictor for the first region and an Intra predictor for the second region, wherein a triangular CIIP predictor corresponding to the Inter predictor for the first region and the Intra predictor for the second region is added to a candidate list for TPM (triangle prediction mode), and the triangular CIIP predictor is used to replace one or more even-numbered candidates or odd-numbered candidates in the candidate list; and encoding or decoding the first region using the Inter predictor and encoding or decoding the second region using the Intra predictor.

13. The method of claim 12, wherein an index is signaled at an encoder side or parsed at a decoder side to indicate whether TPM (triangle prediction mode) or CIIP is applied.

14. The method of claim 13, wherein the index is signaled at the video encoder side or parsed at the video decoder side in a CU (coding unit), CTU (coding tree unit), slice, tile, tile group, SPS (sequence parameter set), or PPS (picture parameter set) level.

15. The method of claim 12, wherein a blending process is performed on an adjacent area of the first region and the second region.

16. An apparatus of video coding, the apparatus comprising one or more electronic circuits or processors arranged to:

receive input data related to a current block in a current picture at a video encoder side or a video bitstream corresponding to compressed data including the current block in the current picture at a video decoder side;

determine whether to apply triangular CIIP (combined Inter/Intra prediction) to the current block;

if the triangular CIIP is applied to the current block:

partition the current block into a first region and a second region using a triangle partition;

determine an Inter predictor for the first region and an Intra predictor for the second region; wherein a triangular CIIP predictor corresponding to the Inter predictor for the first region and the Intra predictor for the second region is added to a candidate list for TPM (triangle prediction mode), and the triangular CIIP predictor is used to replace one or more even-numbered candidates or odd-numbered candidates in the candidate list and encode or decode the first region using the Inter predictor and encode or decode the second region using the Intra predictor.

* * * * *